United States Patent [19]

Palomares

[11] 4,026,979

[45] May 31, 1977

[54] CONTINUOUS PRODUCTON OF EXPANDED CELLULAR MATERIAL OF CIRCULAR CROSS SECTION

[75] Inventor: Severiano Palomares, Madrid, Spain

[73] Assignee: Policastilla, S/A, Madrid, Spain

[22] Filed: Feb. 26, 1975

[21] Appl. No.: 553,115

[52] U.S. Cl. .......................... 264/45.5; 264/45.8; 264/51; 264/216; 264/331; 425/817 C; 428/315

[51] Int. Cl.² ........................................ B29D 27/04

[58] Field of Search ............ 264/54, 51, 45.5, 46.2, 264/DIG. 14, 216, 331; 425/817 C; 428/315

[56] References Cited

UNITED STATES PATENTS

| | | |
|---|---|---|
| 3,099,516 | 7/1963 | Henrickson ............... 264/DIG. 14 |
| 3,325,573 | 6/1967 | Boon et al. .......................... 264/54 |
| 3,476,845 | 11/1969 | Buff et al. ............................. 264/54 |
| 3,560,599 | 2/1971 | Ferstenberg ......................... 264/54 |
| 3,729,534 | 4/1973 | Ferstenberg ......................... 264/54 |
| 3,840,629 | 10/1974 | Marjoram ............................ 264/54 |

OTHER PUBLICATIONS

B223,621, Jan. 1975, Haas, 264 DIG. 14.

Primary Examiner—Philip Anderson
Attorney, Agent, or Firm—Eyre, Mann, Lucas & Just

[57] ABSTRACT

The present invention relates to the continuous production of blocks of circular cross section of expanded cellular material. The material is deposited on a flexible liner which is movable sychronously with a flexible mold element through a stationary longitudinal shaping mold which is of circular cross sectional shape at its discharge end. In accordance with the present invention, cellular blocks of completely circular cross section are produced. The invention also provides for the heating of the flexible mold element to reduce the temperature difference between the elements contacting the expanded cellular material so that more uniform density is obtained.

5 Claims, 7 Drawing Figures

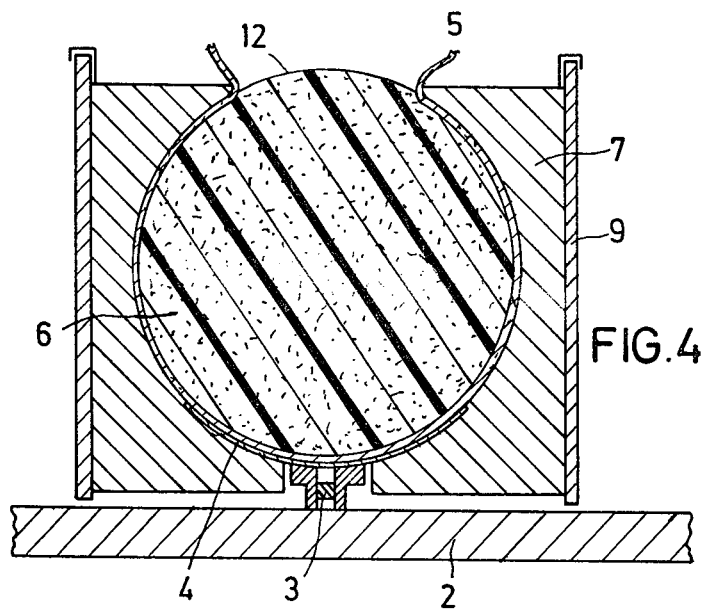
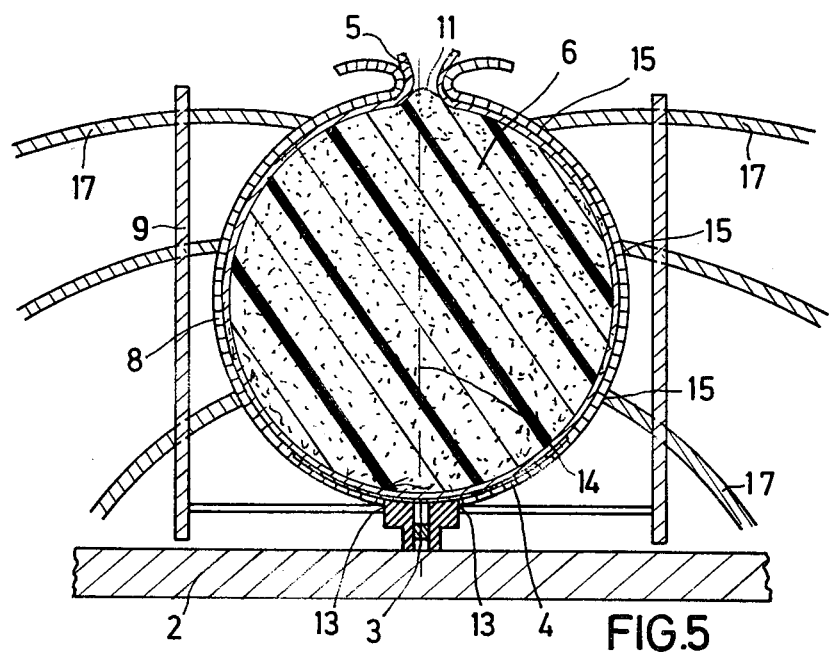

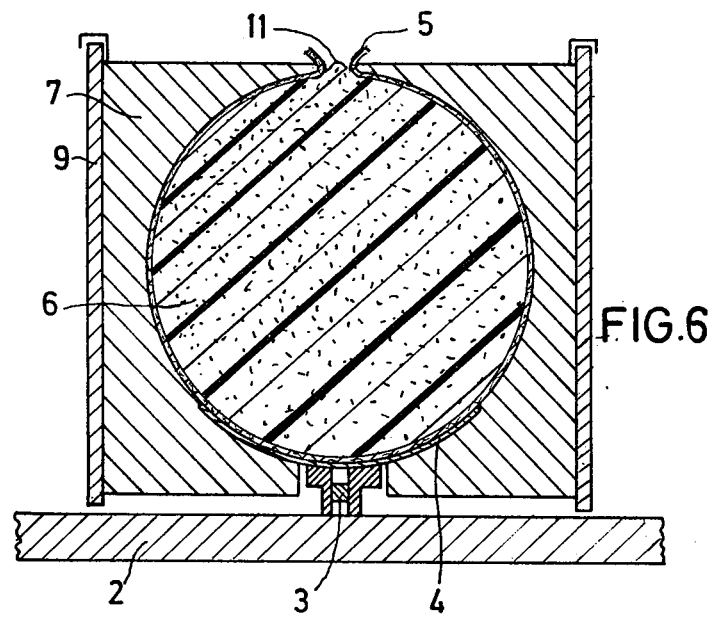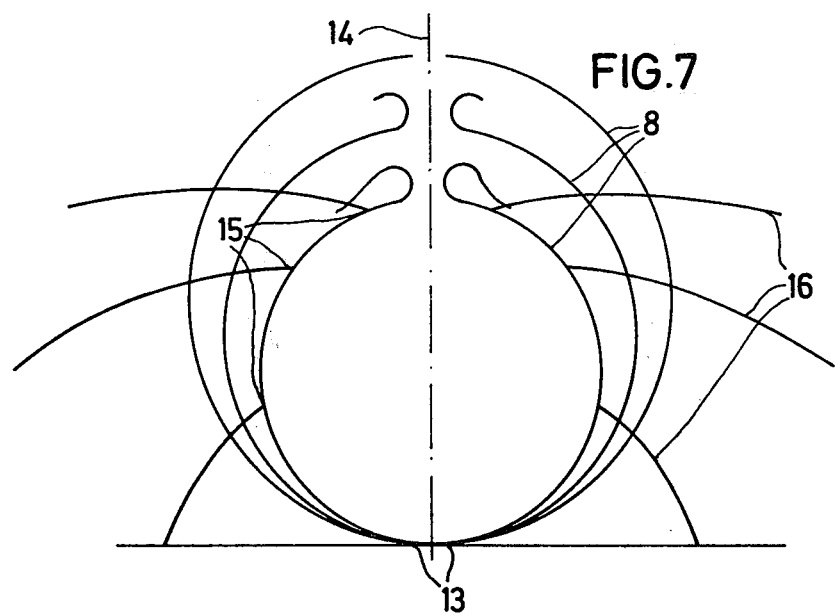

CONTINUOUS PRODUCTON OF EXPANDED CELLULAR MATERIAL OF CIRCULAR CROSS SECTION

The present invention relates to the continuous production of an expanded cellular product, principally polyurethane foam, and other cellular products of similar characteristics, in which a block of circular cross section is obtined.

In the industry engaged in producing continuous blocks of polyurethane foam and, especially, blocks of circular section, which are later to be cut into fine sheets for the production of coils, there is a fundamental problem of obtaining as perfect as possible a block, so as to reduce the waste of material to a minimum. The conventional system obtains a block whose cross section has the bottom and side edges perpendicular to each other and the upper part curved in shape. As will be apparent, this system involves a great waste of material.

On the other hand, since the foaming process is an exothermic reaction, the foam in formation is in continuous contact with the lateral shaping members of the mold causes these members to become very hot, unlike the feed belt, which assumes a lower temperature because it is not constantly in contact with the foam. This temperature difference produces a different densification on the surface of the block, resulting in a greater and harder crust in the lower part, corresponding to the zone of contact with the feed belt, than at the sides. Since this crust must be separated from the block, before the latter is cut into sheets, and becomes scrap, loss of material and weight is greater with production of the lower part denser.

In order to remedy the drawbacks of the conventional system, different studies have been made from which have been obtained two systems for producing continuous blocks of appreciably circular section. One of them makes both the lateral members of the mold and the base movable, and the other places some fixed shapes on the lateral members to shape the foam and leaves the bottom in contact with the bottom of the conveyor belt for carrying the foam. In both cases there is obtained a block of somewhat more circular section than in the conventional system; but with the lower part still flat, resulting in with waste of material.

Further, neither of the two systems outlined reduces either the outer crust or the difference in densities, and in addition make it impossible to vary the diameter of the block to be produced, except by stopping the process and changing the shaping elements, a slow and costly task resulting in sizable losses.

The system pursuant to the invention succeeds in eliminating these drawbacks, with the following advantages:

a. It produces a perfectly circular block, as against those obtained by hitherto known methods, with a corresponding savings in waste material, and the consequent economic advantages.

b. Maximum machine capacity is obtained, since the diameter of the block to be produced is adjustable without any need to halt the process.

c. It reduces to a minimum the losses of material resulting from formation of the skin, a crust of uniform density and minimum thickness being obtained.

d. In contrast with the system of movable lateral shaping elements, it has the advantage of being installable in a conventional production machine within a short period of time, so that the machine may continue producing non-circular blocks.

e. In contrast with the system of shaping elements fixed to the lateral members, it has a greater drag surface, achieving better synchronism between the movement of the foam and the conveyor.

All of these advantages are obtained by virtue of the system comprising stationary shaping elements abutting against the lateral members, which form a lateral section that is perfectly circular except for a portion at its upper part which remains open to allow the gases to escape freely and permits expansion of the foam.

These shaping elements may be rigid, therefore permitting no adjustment of diameter, or they may be flexible, metallic or plastic, elements, consisting of a continuous or jointed plate having sufficient rigidity to keep the pressures exerted by the foam in expansion from deforming its outline, and being sufficiently flexible to enable its shape to be varied, with little effort, by enlarging or reducing the diameter of the mold.

Where the shaping elements are of the flexible type, the lower part thereof will remain stationary while the rest will traverse certain fixed and definite paths, in such manner that in every position it may assume it will form a circumference of greater or lesser diameter.

So that the free part of the flexible shaping elements will describe the paths defined, so that they will at all times form a circumference, this part will slide, at various points of its periphery, along guides that will describe said paths.

To permit carrying of the foam, there has been provided a chain synchronized with the principal conveyor belt, on which chain has been mounted a thin flexible feed belt that adjusts to the circular shaping element; on said belt is placed a lining material such as paper, which prevents adhesion of the foam to the belt when the said foam is still plastic.

So that distribution of the liquid especially which is poured from the discharge regulator, will be adequate in the pour zone, the feed belt and the initial part of the shaping elements present their flat bottom and as growth of the foam proceeds this flat bottom decreases until at the moment of maximum expansion it is perfectly circular.

To facilitate understanding of the nature of the invention, the accompanying drawing shows a schematic representation of its use which is in no way limiting and hence susceptible of any accessory modifications not altering its essential features.

FIG. 4 is a cross-section of the system, in detail along III—III.

FIG. 5 represents a detailed cross-section, along III—III, with flexible shaping elements.

FIG. 6 is a cross-section, along III—III, of the system in another embodiment with the shaping elements more closed.

FIG. 7 represents schematically the different positions that the adjustable shaping elements may assume.

Figure 1:
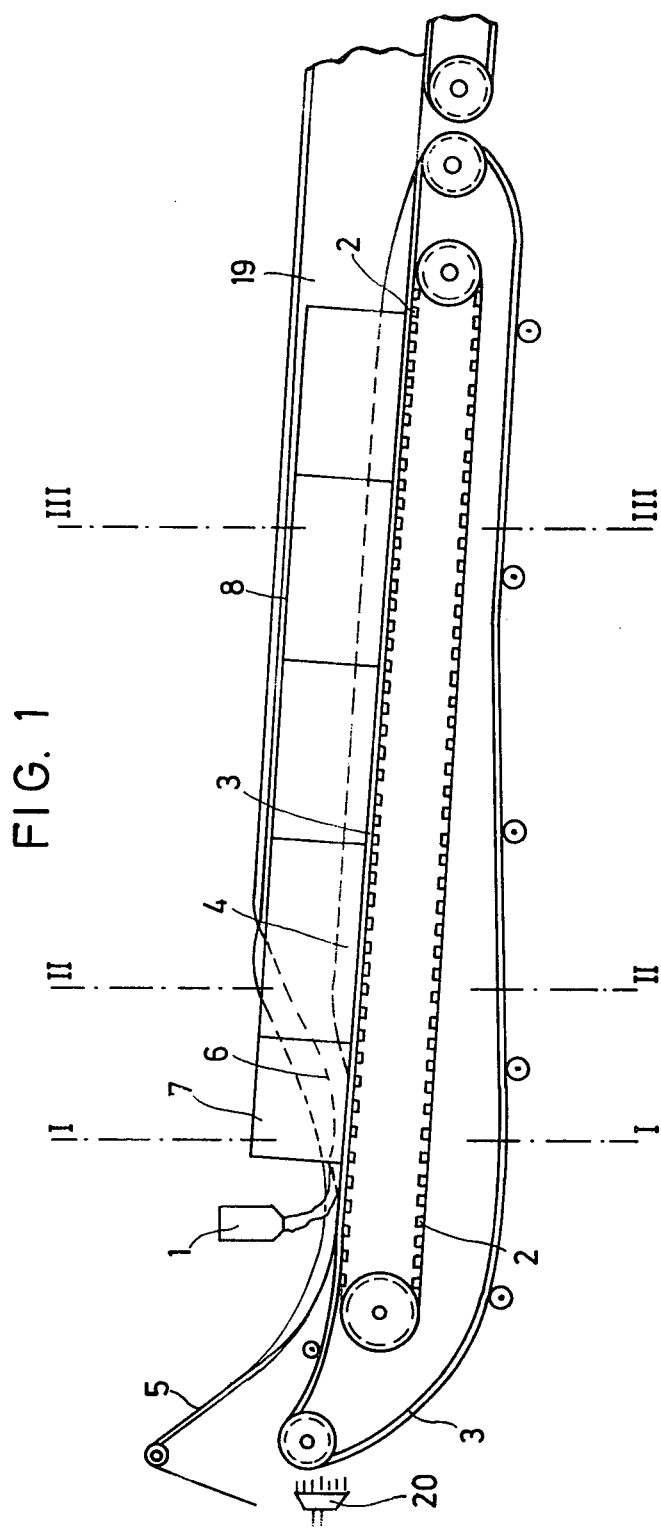
FIG. 1 is a side view of the system.

In these figures the following details are shown:
1. Discharge regulator.
2. Main conveyor.
3. Conveyor chain.
4. Feed belt.

5. Coating band.
6. Foam.
7. Rigid shaping elements.
8. Flexible shaping element.
9. Side walls.
10. Flat base.
11. Bead.
12. Free surface.
13. Fixed points.
14. Center line.
15. Free points.
16. Paths.
17. Guides.
18. Jointed elements.
19. Foam block.
20. Heat emitter.

The new process is based upon the continuous production of a block of expanded cellular product, completely circular in cross-section, with the possiblity of adjusting the diameter of said block and the reduction to a minimum of losses due to waste of material.

The process starts with the liquid product poured by means of discharge regulator 1 and falling onto the main conveyor 2 which will carry the foam 6, in formation, across the mold, which will impart to it the desired shape, in this case circular.

The mold is composed of the flexible of jointed shaping elements 8 or of the rigid shaping elements 7, according as to whether it is desired to adjust the diameter of the block 19 or not. These shaping elements 7 or 8 will be fastened to and will support the side walls 9 and at their lower part they almost join, producing a complete circumference, as shown in FIGS. 4, 5, 6 and 7.

In order to be able to achieve almost complete closing of the shaping elements 7 or 8 at their lower part, and at the same time cause the main conveyor 2 to carry the foam 6, the process provides for the installation of the conveyor chain 3, synchronized with the main conveyor 2, on which is mounted the flexible belt 4 which, being thin and flexible, will adjust to the shaping elements 7 or 8, in the lower part of which elements is obtained the complete circular shape sought.

So that the foam 6, still in pasty state, will not soil the belt 4 and the shaping elements 7 or 8, provision is made for intercalating between said foam 6 and the latter elements the lining material or coating band 5, which may be made of paper. This coating band 5 will exhibit perfect synchronism, in motion, with the foam 6.

Figure 2:
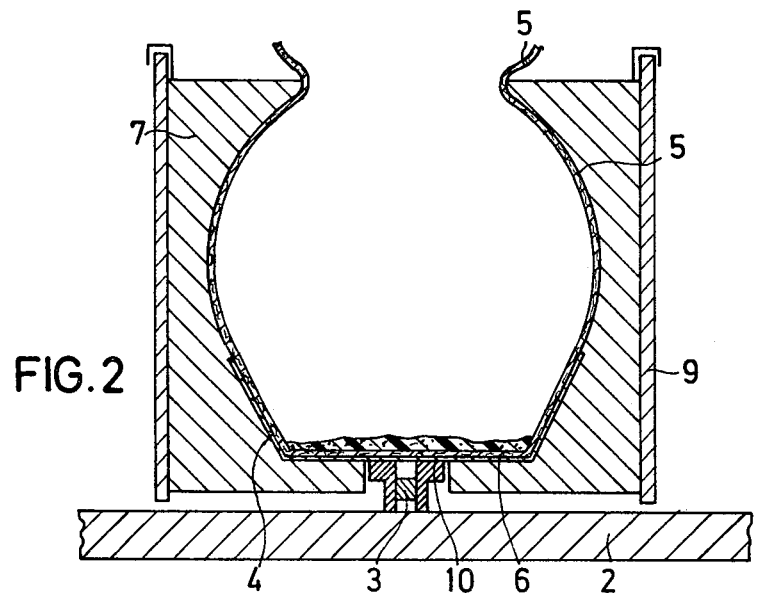
FIG. 2 is a cross-section in detail along I—I.
Figure 3:
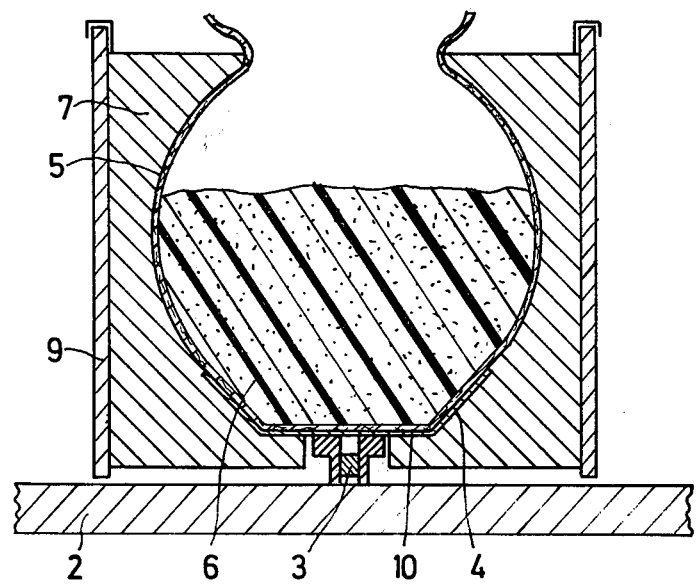
FIG. 3 represents a detailed cross-section along II—II.

So that when the foam 6 is poured on the mold, said pour will be regulated and distributed evenly towards the sides of the mold, the initial shaping elements 7 or 8 will present their flat lower part 10; as may be seen in FIG. 2, with the belt 4 adjusting to said flat base 10. As growth of the foam 6 proceeds, the mold progressively loses its base plane 10, as seen in FIG. 3, until at the moment of maximum growth the shaping elements 8 or 7 are perfectly circular.

In two embodiments of the process it is provided that the rigid shaping elements 7 will remain open at their upper part, as seen in FIG. 4, to permit expansion of the foam 6 and for said foam 6 in this open zone to acquire the proper circular shape. It is also provided for the said shaping elements 7, at their upper part, almost to close, as is seen in the FIG. 6, leaving sufficient space for the gases to escape and the foam to expand and obtaining a perfectly circular block 19 with the bead 11 as the only defect, which will disappear when the first layer or crust is eliminated by cutting.

In order to reduce to a minimum the crust or integral skin formed on the blocks 19, and taking into account that the foaming reaction is exothermic, the new process provides for heating of the belt 4, by means of the heat emitter 20, for the purpose of equalizing its temperature to the temperature acquired by the shaping elements 8 or 7 and thus obtaining a uniform temperature, which will cause the crust formed on the block 19 to be of minimum thickness and homogeneous densification, thus producing the least waste.

Another embodiment of the process provides for the mold to be made with the flexible shaping elements 8, which will be composed of a flexible or jointed plate, in this case with the jointed elements 18, made of metal or plastic material, in such fashion that they will have the necessary rigidity to keep the foam 6, in state of formation, from deforming the mold with its pressures and will have sufficient flexibility to be able to vary in shape and obtain circumferences of greater or smaller diameter. To achieve this, the flexible shaping elements 8 must be attached to supports on side walls 9, i.e. have the fixed point 13, at their lower part, while being attached to guide 17, i.e. the free points 15, on the rest of their body, which will describe fixed paths 16, which in practice are guides 17 or similar elements which when drawn in one or another direction will cause the points 15 selected in each shaping element 8 to assume a suitable position, as is shown in FIG. 7, giving the whole the shape of a circumference. With this arrangement the diameter of the block 19 may be varied without having to halt the process.

With the shaping elements 8 made up of the jointed elements 18, the length of the arc of circumference formed may likewise be adjusted, that is, the circumference may be enclosed, almost to the maximum, at the top, as is seen in FIG. 6, with formation of the bead 11, or the free surface 12 may be left, as seen in FIG. 5.

The paths 16 to be followed by the free points 15 correspond to the geometric loci of said points with relation to the different centers taken on the line 14, in such fashion that the flexible or jointed plates 8 will assume a circular outline of different diameters, as seen in FIG. 7.

When the process starts, the discharge regulator 1 pours the liquid onto coating band 15 resting on belt 4 drawn by the chain 3 which in turn is synchronized with the main conveyor 2. This belt 4 assumes at the beginning the shape of the flat base 10, whereby distribution of the liquid is adequate to obtain the homogeneous densities desired.

When the foam 6 reaches its point of maximum expansion, the shaping elements 7 or 8 already have a completely circular shape, so that the block 19 will exhibit a section which is a perfect circumference, with only the defects corresponding to the crust and the small bead 11 which forms if the shaping elements 7 or 8 are very closed at the top.

If the flexible shaping elements 8 are used, when it is desired to vary the diameter of the block 19 to be obtained, the guides 17 will be activated, which guides will act on the free points 15 of said shaping elements 8 until they assume the circumference of the diameter desired, with no need to halt the process.

The nature of the present invention, as well as its industrial embodiment, having been sufficiently described, there remains to be added only that it is possible to introduce into its whole and constituent parts changes in shape, material and arrangement insofar as such alterations involve no substantial variation thereof.

I claim:

1. A method for the production of expanded foam blocks having circular cross-section comprising depositing the foam in a deposit zone on a flexible coating band which overlays a movable flexible feed belt, synchronously moving the flexible coating band and flexible feed belt in contiguity with the inner wall of a stationary longitudinal shaping mold which varies in cross-sectional shape over at least a portion thereof from the deposit zone to a discharge zone, the shaping mold cross-sectional shape being circular in the discharge zone.

2. A method as recited in claim 1 further comprising heating the flexible feed belt before it reaches said shaping mold in order to reduce to a minimum the integral skin formed on said foam blocks.

3. A method as recited in claim 1 comprising varying the cross section of said longitudinal shaping mold from a flat-bottomed trough shape in the vicinity of the deposit zone to a circular shape in the vicinity of the discharge zone.

4. A method as recited in claim 1 wherein said shaping mold has fixed dimensions.

5. A method as recited in claim 1 further comprising changing the diameter of the circular cross-section of the shaping mold in the discharge zone whereby a different sized block is produced.

* * * * *